United States Patent Office 3,726,819
Patented Apr. 10, 1973

3,726,819
WATER-EXTENDED POLYESTER AND EPOXY RESINS
Willem Dijkhuizen, Zuidlaren, Netherlands, assignor to Scholten-Honig Research N.V., Foxhol, Netherlands
No Drawing. Filed Dec. 29, 1970, Ser. No. 102,519
Claims priority, application Great Britain, Dec. 30, 1969, 63,186/69; July 14, 1970, 33,994/70
Int. Cl. C08f 21/04; C08g 17/04, 30/00
U.S. Cl. 260—22 CB                    20 Claims

ABSTRACT OF THE DISCLOSURE

Water extended resins are produced by curing an emulsion of water in a thermosetting resin in the presence of a catalyst and an emulsifier, the thermosetting resin being either an unsaturated polyester prepolymer containing a vinyl monomer copolymerizable therewith, or a low molecular weight epoxy resin. According to the invention the emulsifier is an organic compound which (a) is capable of forming emulsions of the water-in-oil type
(b) is substantially insoluble in water, but soluble or dispersible in styrene and in the thermosetting resin;
(c) has emulsifying properties such that an emulsion of 0.5 part of said emulsifier, water in styrene containing 0.5 part of said emulsifier, 100 parts of styrene, and 150 parts of water does not separate any water and not more than 5 ml. of styrene from 100 ml. of the emulsion after standing for 60 minutes at 20° C.

---

This invention relates to improvements in water containing resins. The invention is more particularly directed to processes for the manufacture of water extended polyester and epoxy resins and to the water extended resins obtained thereby.

It is already known to manufacture water extended polyester resins by forming a water-in-oil emulsion of water as the dispersed phase, an unsaturated polyester prepolymer and a vinyl monomer copolymerizable therewith and being substantially insoluble in water as the continuous phase and curing the W/O emulsion in the presence of a catalyst system. The unsaturated polyester prepolymers are prepared from unsaturated dibasic acids (such as maleic acid and fumaric acid) and, if desired, other dibasic acids, by esterification with saturated polyhydric alcohols (such as glycols). The copolymerizable vinyl monomers, e.g. styrene, acrylic acid esters, methacrylic acid esters or diallyl phthalate, are capable of reacting with the polyester prepolymers via the double bonds in the unsaturated dibasic acid radicals, thereby forming a three dimensional cross linked structure. The copolymerization can be promoted by adding a curing system, consisting of a catalyst (e.g. a peroxide, such as benzoyl peroxide) and an accelerator (e.g. dimethylaniline) which can make react the polyester prepolymer and the vinyl monomer at ambient temperature. In case no water is added, a thermosetting, infusible polyester resin results. If water is incorporated in the formulation, emulsions of the water-in-oil type may be formed, which emulsions may be cured to polyester resins containin fine droplets of water uniformly dispersed in the resin. These water extended polyester resins are white in colour look like finegrained plaster. The use of water as an extender for polyester resins offers several advantages, such as lower cost, moderation of the exothermic cure temperature and reduced flammability. The water content may be varied over a wide range. Water extended polyester resins containing 100 to 150% of water based on the weight of dry resin substance have high compressive strengths approaching those of concrete, whereas at 900% water non-load bearing materials similar to polyurethane foam or polystyrene foam are obtained.

The most important factor in producing uniform water extended polyesters is to make stable emulsions, which do not collapse during the polymerisation reaction. To this end various emulsifiers have been incorporated in the formulations to be polymerized.

It has been proposed in U.K. patent specifications No. 962,699 and No. 964,195 to use as emulsifier for forming curable emulsions of the water-in-oil type of vinyl monomers and a relatively small proportion of a unsaturated polyester, linear polymers which have been prepared by grafting polymerizable vinyl compounds, such as styrene, voinyl acetate or methyl methacrylate on polyalkylene oxides, such as polyethylene oxide. It has been found, however, that when the grafted polyalkylene oxide type emulsifiers are used for compositions containing weight for weight more unsaturated polyester prepolymer than vinyl monomer, water cannot be emulsified sufficiently and during polymerization of the unstable emulsion most of the added water is separated. Low molecular weight emulsifiers which have been proposed in U.K. patent specification 959,131 as emulsifying agents for forming emulsions of the water-in-oil type are alkaline earth salts of longchain fatty acids, such as magnesium oleate and fatty acid esters of sugars and sugar alcohols, such as saccharose mono- or dilaurate, saccharose mono- or distearate or sorbitan monooleate. These emulsifiers have been found to be rather ineffective and their use does not give water extended polyester resins which can satisfactorily be applied for various applications.

Epoxy resins; in common with polyester resins, are thermosetting materials. When the usual raw material for the synthesis of epoxy resins, i.e. glycidyl ethers of polyvalent phenols or of polyvalent alcohols, are converted by a curing agent, hard infusible epoxy resins are formed. The thermosetting epoxy resins possess a number of valuable properties, which are described by H. Lee and K. Neville in their book "Epoxy Resins (Their-Applications and Technology," McGraw-Hill Book Company Inc., 1957. In this book a survey is given of the basic epoxy group containing raw materials which are comcercially being used for the manufacture of epoxy resins. Suitable curing agents are according to this book, specific amines, amides, organic acids and acid anhydrides. Furthermore the diluents, fillers, resinous modifiers, plasticizers and flexibilizers, which can be used to vary the properties of the cured epoxy resins, are also described. By adding blowing agents, which act during cure at an initial temperature of about 100° C., light weight epoxy foams may be formed with a density of 100–200 kg./m.³. However, the production of uniform water-extended epoxy resins by curing a water-in-oil emulsion of water in a low molecular weight epoxy resin in the presence of a curing agent is not known.

An object of the present invention is to improve the process for the manufacture of water extended polyesters by incorporating specific, highly effective emulsifying agents in the resin forming formulations.

A further object of the present invention is to obtain improved water extended polyesters, which have an extremely uniform structure and which have very good mechanical properties.

Another object of the present invention is to develop a process for the manufacture of water extended polyepoxides by incorporating specific, highly effective emulsifying agents in the resin forming water-in-oil formulations.

Still another object of the present invention is to provide water extended polyepoxides, which have an extremely uniform structure and which have excellent mechanical properties.

According to the present invention there is provided a process for the manufacture of water extended resins which comprises mixing and agitating.

(a) a thermosetting resin consisting of an unsaturated polyester prepolymer containing a copolymerizable vinyl monomer being substantially insoluble in water, or consisting of a low molecular weight epoxy resin, (b) 0.1 to 5% based on the weight of the thermosetting resin of an emulsifier capable of forming emulsions of the water-in-oil type, which is an organic compound which is substantially insoluble in water but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., and (c) water to form a stable water-in-oil emulsion and curing this water-in-oil emulsion in the presence of a catalyst.

The invention also provides a water-in-oil emulsions which can be cured in the presence of a catalyst thereby forming a uniform water extended resin, consisting of:

(a) a thermosetting resin consisting of an unsaturated polyester prepolymer containing a copolymerizable vinylmonomer being substantially insoluble in water, or consisting of a low molecular weight epoxy resin, and 0.1 to 5% based on the weight of the thermosetting resin of an emulsifier capable of forming emulsions of the water-in-oil type, which is an organic compound which is substantially insoluble in water but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., as the continuous oil phase, and (b) as the dispersed phase.

The organic compounds useful as emulsifying agents in the manufacture of water extended resins according to this invention preferably are condensation products obtained by esterification or etherification, which contain in their molecules residues of a low molecular weight polyhydric alcohol and at least one oleophilic component containing a hydrocarbon radical of at least 7 carbon atoms and if desired, residues of a polybasic acid, said organic compounds preferably having an average molecular weight within the range of from 1000 to 10,000, a hydroxyl number within the range of from 80 to 240 and an acid number within the range of from 0 to 50.

The aforesaid organic compounds may be obtained by reacting, preferably by esterification or etherification, compounds capable of introducing the above indicated residues in the final reaction products.

Among compounds capable of introducing the residues of an oleophilic component containing a hydrocarbon radical of at least 7 carbon atoms, are higher saturated or unsaturated fatty acids, high hydroxy fatty acids and the inner esters thereof, polymerized polyunsaturated fatty acids such as e.g. dilinoleic acid, rosin acids, synthetic higher aliphatic acids, partial or complete esters of a higher fatty acid and a polyhydric alcohol, such as e.g. mono-, di- and triglycerides or mixtures thereof, natural oils and fats of the non-drying, semidrying and drying type; higher fatty alcohols such as lauryl alcohol, oleyl alcohol, elaidyl alcohol, stearyl alcohol and ricinoleyl alcohol; abietyl alcohol; oxalcohols; epoxyalkanes containing at least 7 carbon atoms such as epoxyoctadecane.

Among compounds capable of introducing the residue of a polyhydric alcohol are polyhydric alcohols such as glycerol, sorbitol, mannitol, sorbitan, diglycerol and polyglycerols; polyepoxides, e.g. butadiene dioxide, diglycidyl ether, vinylcyclohexene dioxide or glycidyl poly-ethers of polyhydric alcohols or polyhydric phenols.

Among compounds capable of introducing the residues of polybasic acids are polybasic carboxylic acids such as aliphatic and aromatic dicarboxylic acids and anhydrides thereof, e.g. maleic acid, fumaric acid, adipic acid, sebacic acid, azelaic acid, malic acid, maleic anhydride; organic polyisocyanates such as aliphatic and aromatic diisocyanates e.g. tolylene dicyanate; and phosphorus oxychloride.

The organic reaction products to be used according to the invention must be soluble or dispersible in styrene but should be substantially insoluble in water. They must be able to give stable emulsions of water in styrene. This property is checked by the Styrene Emulsion Test as follows: Dissolve or disperse 0.5 gram of the product in 100 grams of styrene. Pour this solution in a beaker of a Hamilton Beach mixer or a Hamilton Multimixer. While stirring the Hamilton mixer 150 grams of water are added over a period of 15 seconds, whereafter stirring is continued for 1 minute. Pour 100 ml. of the emulsion in a calibrated cylinder and record the volume of the styrene and water which separate after 60 minutes holding time at 20° C. The organic compounds satisfy the emulsifying requirements according to this invention if the volume of the separated styrene layer, if any, is less than 5 ml. and no water is separated at 20° C.

The high molecular weight organic compounds useful as emulsifying agents for the purpose of the invention may be produced by various known processes. According to the preferred method said compounds are produced by heating together a mixture of compounds capable of reacting to form a reaction product containing the residues of a polyhydric alcohol, of a higher fatty acid and of a polybasic acid. Emulsifying agents of this type are described and claimed in British patent specification No. 647,133 and they may be manufactured in accordance with the procedures disclosed therein. According to a preferred method very effective emulsifying agents are obtained by heating a uniform mixture of a polyhydric alcohol, an organic carboxylic acid containing a hydrocarbon radical of at least 7 carbon atoms and a polybasic carboxylic acid or anhydride. Suitable polyhydric alcohols are glycerol, diglycerol, polyglycerol, sorbitol, mannitol, erythritol and sorbitan. Of these glycerol, diglycerol, polyglycerol and sorbitol are preferred. As carboxylic acids may be used higher saturated or unsaturated fatty acids, such as caprylic acid, lauric acid, palmitic acid, stearic acid, higher hydroxy fatty acids, such as ricinoleic acid or its inner ester, polymerised polyunsaturated fatty acids, such as dilinoleic acid, rosin acids, such as abietic acid and synthetic higher aliphatic acids such as versatic acids. Of these, oleic acid, lauric acid, stearic acid and caprylic acid or mixtures thereof are preferred. Suitable polybasic carboxylic acids or anhydrides are adipic acid, azelaic acid, sebacic acid, fumaric acid, maleic acid, maleic anhydride, succinic anhydride and phthalic anhydride. Of these adipic acid, azelaic acid, sebacic acid and fumaric acid are preferred. The mixture of these ingredients is generally heated to a temperature of 200 and 250° C., for such a time that the esterification product obtained has acquired the emulsifying properties hereinbefore defined. It is preferred to use about 0.7 to 2 moles of organic carboxylic acid and 0.7 to 1.1 moles of polybasic carboxylic acid or anhydride per mole of polyhydric alcohol.

Instead of the separate polyhydric alcohol and fatty acid it is also possible to use an ester of a polyhydric alcohol and a higher carboxylic acid, such as e.g. a monoglyceride derived from natural oils and fats and heat this ester with the polybasic carboxylic acid or its anhydride.

It is also possible to heat a triglyceride such as occur in natural oils and fats with a polybasic carboxylic acid or its anhydride and after the heating of the polybasic organic acid or anhydride thereof with the triglyceride has been in progress for some time, a polyhydric alcohol, e.g. glycerol, is added, and the heating is then continued.

Instead of a polybasic carboxylic acid or anhydride thereof there may be used other polybasic acids or compounds capable of introducing into the esterification reaction product the residues of such polybasic acids, e.g. phosphorus oxychloride or aliphatic and aromatic polyisocyanates such as hexamethylene diisocyanate or tolylene diisocyanate.

If a drying oil of the linseed oil-type is used as the triglyceride and an ethene-alpha-beta-dicarboxylic acid or anhydride thereof as the polybasic carboxylic acid, the reaction between the triglyceride and the dibasic carboxylic acid or anhydride may, if desired, also be carried out in the presence of a substance forming organic free radicals such as e.g. benzoylperoxide.

Other preferred esterification products useful as emulsifying agents in this invention may also be produced by starting from polyglycerol such as a penta- or hexaglycerol, and esterifying said polyglycerols with a higher fatty acid or a substance capable of introducing the residues of a higher fatty acid. In this case preferably more than 2 moles of fatty acid are used per mole of polyglycerol.

The esterification reaction products manufactured in the manners described above may still contain a number of free acid groups, corresponding with an acid number within the range of 0–50.

According to another process the high molecular weight organic compounds, soluble or dispersible in styrene but substantially insoluble in water useful to be employed as emulsifying agents according to the present invention are produced by heating together (1) a component selected from the group consisting of polyepoxides, polyhalohydrins and epihalohydrins and (2) an oleophilic component having at least 7 carbon atoms selected from the group consisting of aliphatic alcohols, alicyclic alcohols, aliphatic epoxides and alicyclic epoxides. Emulsifying agents of this type may be prepared by the processes described and claimed in British patent specification No. 887,442. According to these processes optimum results are achieved when an oleophilic compound, i.e. an alcohol or epoxide, with 12 or more carbon atoms is used as a starting material.

Other emulsifying agents useful in the manufacture of the water extended resins according to this invention can be produced by still another process which involves prolonged heating and polymerisation, with or without previous or simultaneous oxidation, of fatty oils containing linoleic or linolenic acid, e.g. linseed oil, soybean oil, cottonseed oil, sesame oil and groundnut oil. The heating of the fatty oil, which is usually carried out at a temperature of about 250° C., should be continued so long, that the polymerisation and or oxidation reaction product is soluble or dispersible in styrene but substantially insoluble in water and has the required emulsifying properties to give a stable water-in-styrene emulsion. These types of emulsifying agents can be produced i.e. in accordance with the processes described and claimed in British patent specification No. 187,298.

The organic compounds to be used as emulsifying agents in accordance with the present invention preferably are characterised by a branched or slightly cross-linked structure in which the oleophilic-hydrophilic properties and the degree of branching or crosslinking respectively are so adjusted that said organic compounds possess the desired physical characteristics i.e. that they are soluble or dispersible in styrene but substantially insoluble in water and that they give stable water-in-styrene emulsions as hereinbefore described. They may be used in unpurified or in purified form.

The polyester prepolymers to be employed as thermosetting resins in the present process are substantially linear unsaturated polyesters based on di-or trivalent alcohols and $\alpha,\beta$ unsaturated dicarboxylic acids. As di- or trivalent alcohols may be used ethylene glycol, propylene glycol, 1,3-butylene glycol, diethylene glycol, dipropylene glycol, neopentylglycol, bisphenol and glycerol etc. Suitable $\alpha,\beta$ unsaturated dicarboxylic acids are maleic acid, fumaric acid, itaconic acid, chloromaleic acid, mesaconic acid, citraconic acid or anhydrides of these acids.

Further acids which may be incorporated in the polyester prepolymers are phthalic acid, isophthalic acid, terephthalic acid, tetrachlorophthalic acid, succinic acid, adipic acid or their anhydrides. A great variety of these unsaturated polyester prepolymers are commercially available as such or in admixture with copolymerizable vinyl monomers, in particular styrene. Vinyl monomers other than styrene which are copolymerizable with unsaturated polyester prepolymers and which are substantially insoluble in water are methyl styrene, vinyltoluene, alkyl acrylates, alkyl methacrylates, alkyl vinylethers, vinylacetate, diallyl phthalate, alkyl maleates and alkyl fumarates.

The proportion of the unsaturated polyester prepolymer and the copolymerizable vinylmonomer may be varied over a wide range, varying from 90% of polyester and 10% of vinylmonomer to 10% of polyester and 90% of vinyl monomer. Preferably the mixture contains from about 50 to 75% of unsaturated polyester prepolymer and from about 25 to 50% of copolymerizable vinyl monomer.

Catalysts which initiate the curing of the unsaturated polyester prepolymer and the vinyl monomer are peroxides or hydroperoxides such as benzoylperoxide, methyl ethyl ketone peroxide, cyclohexanone peroxide, lauroyl peroxide, and hydrogen peroxide, persulphates or azo compounds, such as azobisisobutyronitrile. Suitable accelerators for these catalysts are cobalt salts, such as cobalt naphthenate or cobalt octoate (to be used with ketone peroxides or hydroperoxides) or tertiary amines, such as dimethyl aniline or dimethyl p-toluidine (to be used with benzoyl peroxide). The catalysts may be added to the mixture of polyester prepolymer and vinyl monomer before or after the incorporation of water in emulsified form. The promotor may then be added dissolved in styrene. It is also possible to incorporate the promotor in the resin formulation, to emulsify the water in and to add finally a solution of the catalyst to the emulsion. In case a water soluble catalyst is used, this may be added in the form of an aqueous solution.

Depending on the catalyst used and the promotor, if any, the resin will cure at ambient temperature or at temperatures above that, up to about 70° C. and in special cases even higher.

Any low molecular weight epoxy resin, which can be emulsified in liquid form with water, may be used as thermosetting resin for the process according to the invention. We preferably use liquid epoxy resins having an average molecular weight up to 500, the polyglycidyl ethers of diphenylol propane being a specially preferred species. Other suitable low molecular weight epoxy resins are glycidyl ethers of diphenylol methane, of long chain bisphenols, of novolac resins or of glycerol and mixtures of these glycidyl ethers.

Suitable curing agents are primary aliphatic polyamines (or secondary amine adducts thereof with monofunctional or difunctional glycidyl compounds, ethylene oxide, propylene oxide or acylonitrile), primary aromatic diamines, tertiary amines (or salts thereof), piperidine, dicyandiamide, organic dibasic and polybasic acids and acid anhydrides, polyacrylic acid or polyacrylamide.

The curing of the W/O emulsion of these thermosetting epoxy resins may be effected over a wide temperature range up to 100° C. It is preferred to mix the epoxy resin forming components at ambient temperature or slightly above that and to cure the emulsion at temperatures in the range of 40° C. to 80° C.

The emulsifier to be used according to the invention is preferably incorporated in the thermosetting resin. It may be used in a proportion of about 0.1 to about 5% and preferably in a proportion of 0.25% to 1.5% based on the weight of the thermosetting resin. In a bath procedure the mixture of curable resin, emulsifier and catalyst, or promotor, if any, are mixed with the desired amount of water while stirring effectively. This stirring can be done by using a high shear stirrer, such as the mixers used in the preparation of the styrene emulsions mentioned above. The amount of water to be added to the curable resin mixture may vary over a wide range, from about 10% to about 900% based on the weight of the resin. Preferably the amount of water is for polyesters in the range of 50 to 400% of the weight of the curable polyester mixture and for polyepoxies in the range of 50 to 150% of the weight of the curable epoxy resin. The water to be incorporated may be pure water, but if desired or if necessary it may contain dissolved salts or dyes. After an emulsion of water in the curable resin mixture has been formed the remaining catalyst or promotor, if any, may be added.

Instead of using a batch procedure it is also possible to use effective continuous mixing equipment in which the mixture of thermosetting resin and emulsifier, the water and the catalyst are mixed and dispensed continuously. In case a promotor is used care must be taken that the catalyst and promotor are supplied in separate streams to the mixing equipment.

The water extended resins may be formed by several techniques, such as by casting in open or closed moulds, by spraying and the like. In the formulation various other additive may be used such as dyes, pigments, granular fillers e.g. asbestine, ground silica's, calcium carbonate, kaolin, talc, titanium dioxide, diatomaceous earth and bentonite, and reinforcing agents, such as glass fiber, asbestos fiber, metallic fiber, cotton fiber, rayon fiber and synthetic fiber.

Depending upon the amount of water incorporated, the nature and composition of the thermosetting resin and any fillers or reinforcing agents, water extended resins of varying flexibility and mechanical strength are obtained.

All water extended resins obtained by the improved process according to the invention are characterized by a very homogeneous cell structure and by a very small cell size, in the order of $1\mu$ in diameter. The resins exhibit a low shrinkage, the linear shrinkage being less than 1%. Although the water extended resins are dry to the touch, they may lose water when exposed to the air. This loss of water is sped up by increasing the temperature or by decreasing the air pressure. However, the water loss does not substantially lower the mechanical strength. The water loss of the water extended resins may be prevented by coating the surface with a water barrier, such as a polyester coating. The water extended resins can be sawed or machined in any other way. They can be nailed and screwed without cracking. They have a good chemical resistance and they are incombustible and heat resistant. These water extended resins have a wide range of applications, such as materials of construction which can replace wood, plaster and foamed plastics. They may be used for instance in the furniture industry, in the ceramic industry, in filtering and sound proofing media, for flooring applications and for various construction purposes.

They may also be used as casting, potting, encapsulation, sealing and coating materials.

The advantages of the application of the emulsifiers according to the invention in formulations for producing water extended thermoset resins reside in the fact that these emulsifiers are capable to form very stable emulsions with a large variety of commercial polyester and polyepoxy resins at room temperature, which remain stable at higher temperature. They permit, even when used at relatively low levels, or in slowly curing systems, the incorporation of large amounts of water. The emulsions do not collapse during curing, neither by the effect of the exothermic heat of reaction, nor by the reaction itself, thereby forming a very uniform water extended resin.

The invention will be illustrated by the following examples:

EXAMPLE 1

A mixture of 350 parts by weight of a technical monoglyceride of palm oil and 35 parts by weight of adipic acid are heated while stirring in a carbon dioxide atmosphere for 30 minutes at a temperature of 230° C. The mixture is cooled to 160° C., whereupon 63 parts by weight of of fumaric acid are added and heating is continued for 90 minutes at a temperature of 220° C. The highly viscous, stringy reaction product thus obtained is soluble in styrene, but insoluble in water. It has a hydroxyl number of 89 and an acid number of 40 and an average molecular weight of 1450. A water in styrene emulsion is made by stirring in a Hamilton Beach mixer a solution of 0.5 grams of this reaction product in 100 grams of styrene with 150 grams of water. 100 ml. of this emulsion separates in 60 minutes 1 ml. of styrene and no water.

The above described reaction product is used as emulsifying agent in the manufacture of a water extended polyester resin. In 60 parts by weight of an unsaturated polyester prepolymer (based on maleic acid anhydride and propylene glycol) and 40 parts by weight of styrene 1 part by weight of the above reaction product is dissolved in the beaker of a laboratory mixer. While stirring, 100 parts by weight of water are poured in over a period of 2 minutes, whereafter stirring is continued for another minute. Then are added 2 parts by weight of benzoyl peroxide powder (50% active) and thereafter 1 part by weight of a 10% solution of dimethyl aniline in styrene. The emulsion is poured in a plastic cylindrical mould and cures at ambient temperature in about 40 minutes. A white, homogeneous, plasterlike water extended polyester resin of very fine and uniform cell size is formed.

When in this formulation is stead of the emulsifier according to the invention low molecular weight emulsifiers are used, such as glycerol monooleate, sorbitan sesquioleate and polyoxyethylene sorbitantrioleate, no homogeneous water extended polyester resins are obtained. These compounds are not capable of forming stable water-in-styrene emulsions as hereinbefore defined, since they separate off 16 ml· of styrene after 60 minutes (sorbitan sesquioleate) or do not form a stable emulsion at all.

EXAMPLE 2

A mixture of 160 parts by weight of diglycerol 211 parts by weight of oleic acid, 108 parts by weight of caprylic acid and 1.2 parts by weight of magnesium stearate is heated while stirring in a current of carbon dioxide gas for 60 minutes at a temperature of 210° C. and for 120 minutes at a temperature of 230° C. The mixture is cooled to a temperaturue of 160° C. and 84 parts by weight of fumaric acid are added, whereupon heating is continued for another 120 minutes at 220° C. In this way a stringy, viscous reaction product is obtained, which is soluble in styrene and insoluble in water. The hydroxyl number of the reaction product is 156 and the acid number is 12 and an average molecular weight of 1600.

100 ml. of a water in styrene emulsion, made from a solution of 0.5 gram of this reaction product in 100 grams of styrene and 150 grams of water, separates no styrene and no water after 60 minutes. The above described reaction product is used in the following formulation for making a water extended polyester resin:

70 parts by weight of an unsaturated polyester prepolymer (based on maleic acid anhydride, adipic acid, ethylene glycol, butylene glycol)
30 parts by weight of styrene
1 part by weight of the reaction product
100 parts by weight of water
2 parts by weight of benzoyl peroxide powder (50%)
1 part by weight of a 10% solution of dimethyl aniline in styrene.

The ingredients are mixed in this sequence and the emulsion is casted in a plastic mould. It hardens while giving a homogeneous, water extended polyester of very fine and uniform cell size.

EXAMPLE 3

A stringy, viscous reaction product is made by heating, while stirring under a carbon dioxide blanket, for 70 minutes at a temperature of 220° C. a mixture of the following ingredients:

191 parts by weight of sorbitol, 0.5 aq.
225 parts by weight of oleic acid
202 parts by weight of sebacic acid
0.5 part by weight of magnesium stearate.

The reaction product has an hydroxyl number of 186 and an acid number of 35 and an average molecular weight of 1360. It is insoluble in water, but soluble in styrene. When subjected to the styrene emulsion test as hereinbefore defined, 100 ml. of a water-in-styrene emulsion, consisting of 0.5 part by weight of the reaction product, 100 parts by weight of styrene and 150 parts by weight of water, separates 0.25 ml. of styrene and no water after 60 minutes.

The above reaction product is used in the following formulation for making a water extended polyester resin:

60 parts by weight of an unsaturated polyester prepolymer (based on maleic acid anhydride, phthalic anhydride and propylene glycol)
40 parts by weight of styrene
3 parts by weight of the reaction product
250 parts by weight of water
1.25 parts by weight of cobalt octoate (12%)
0.5 part by weight of dimethylaniline
1 part by weight of peroxide catalyst (containing 0.1 part of methyl ethyl ketone peroxide and 0.2 part of hydrogen peroxide).

The ingredients are mixed one after the other in a Hamilton Beach mixer and the emulsion obtained is poured in a cylindrical mould. It cures at ambient temperature, while forming a perfectly uniform, fine-celled, water extended polyester resin.

EXAMPLE 4

A mixture of 160 parts by weight of diglycerol
270 parts by weight of stearic acid
160 parts by weight of adipic acid
0.7 part by weight of magnesium stearate is heated for 120 minutes in a carbon dioxide atmosphere under stirring at a temperature of 220° C.

A viscous, stringy reaction product is obtained, having an hydroxyl number of 155 and an acid number of 18 and an average molecular weight of 2100. It is insoluble in water, but soluble in styrene. When subjected to the styrene emulsion test as hereinbefore defined, it separates no styrene and no water. The viscous reaction product is used as an emulsifier in the manufacture of a water extended polyester, using the following formulation:

70 parts by weight of an unsaturated polyester prepolymer (based on maleic acid anhydride and propylene glycol)
30 parts by weight of methyl methacrylate
2 parts by weight of the above reaction product
100 parts by weight of water
2 parts by weight of benzoyl peroxide powder (50%)
2 parts by weight of a 10% solution of dimethyl aniline in styrene.

These ingredients are mixed in a Hamilton Beach mixer and poured in an open mould. The emulsion cures to a uniform, fine-celled, water extended polyester resin.

EXAMPLE 5

Glycerol is polymerized by heating 200 parts by weight of glycerol and 4 parts by weight of sodium acetate for 25 hours at a temperature of 180° C. to 240° C. the pressure being reduced to 10 cm. Hg. The polyglycerol obtained in this way has, mixed with water in a ratio of 1 part polyglycerol to 0.5 part of water, a viscosity of 228 poises at a temperature of 20° C. It is substantially a mixture of pentaglycerol and hexaglycerol.

280 parts by weight of polyglycerol, 410 parts by weight of oleic acid and 1 part by weight of magnesium stearate are heated in a current of carbon dioxide while stirring for 120 minutes at a temperature of 230° C. The resulting viscous liquid is soluble in styrene, but insoluble in water. It has an hydroxyl number of 211 and an acid number of 4 and an average molecular weight of 1800 and is capable of forming a water-in-styrene emulsion containing by weight 0.5 part of the reaction product, 100 parts of styrene and 150 parts of water. 100 ml. of this emulsion separates within 60 minutes 1 ml. of styrene, but no water. The viscous reaction product is used in the preparation of a water extended polyester resin, using the same formulation as described in Example 1. A very white and uniform, water extended polyester resin with extremely fine cells is obtained.

EXAMPLE 6

A stringy, viscous reaction product is made by heating, while stirring under a carbon dioxide blanket, for about 180 minutes at a temperature of 220° C. a mixture of 160 parts by weight of diglycerol, 188 parts by weight of azelaic acid, 200 parts by weight of lauric acid and 2 parts by weight of magnesium stearate. The reaction product has an hydroxyl number of 120 and an acid number of 8.

A water in styrene emulsion is made by stirring a solution of 0.5 gram of the reaction product in 100 grams of styrene with 150 grams of water. 100 ml. of this emulsion separates after 60 minutes 1.5 ml. of styrene and no water.

The above described emulsifying agent is used in the following formulation for preparing a water extended resin of methylmethacrylate-polyester.

100 parts by weight of methyl methacrylate
20 parts by weight of an unsaturated polyester prepolymer (based on maleic acid anhydride and propylene glycol) 1:1 dissolved in styrene
3 parts by weight of the emulsifying agent
120 parts by weight of water
2.5 parts by weight of benzoyl peroxide powder (50%)
2.5 parts by weight of a 10% solution of dimethyl aniline in styrene.

The unsaturated polyester prepolymer and the emulsifying agent are dissolved in the methyl methacrylate. While stirring the water is added over a period of 30 seconds. After additional stirring during 1 minute the benzoyl peroxide powder is added and thereafter the dimethyl aniline solution.

The emulsion is poured in a plastic cylindrical mould and is cured at ambient temperature. A homogeneous, plaster like water extended resin of methyl methacrylate-polyester is obtained. The cell size is very fine and uniform.

EXAMPLE 7

A mixture of 160 parts by weight of diglycerol, 202 parts by weight of sebacic acid, 226 parts by weight of oleic acid and 2 parts by weight of magnesium stearate is heated while stirring in a carbon dioxide atmosphere at a temperature of 210° C. for about 180 minutes. A stringy, viscous reaction product is obtained, which is soluble in styrene and insoluble in water. The product has an hydroxyl number of 172 and an acid number of 12.

100 ml. of a water in styrene emulsion made from a solution of 0.5 gram of the reaction product in 100 grams of styrene and 150 grams of water, separates 2 ml. of styrene and no water after 60 minutes.

The above obtained reaction product is used as emulsifying agent in the following formulation for making a water extended resin of styrene-polyester.

100 parts by weight of styrene
20 parts by weight of an unsaturated polyester prepolymer (based on maleic acid anhydride an propylene glycol 1:1 dissolved in styrene).
3 parts by weight of the reaction product
120 parts by weight of water
1.5 part by weight of cyclohexanone hydroperoxide
2.5 parts by weight of cobalt naphthenate.

The ingredients are mixed in this sequence and the emulsion is cast in a plastic cylindrical mould and is cured at 40° C. during 1 hour. A homogeneous, water extended resin of styrene-polyester of very fine and uniform cell size is obtained.

EXAMPLE 8

A mixture of 160 parts by weight of diglycerol,
270 parts by weight of oleic acid,
160 parts by weight of adipic acid and
0.7 parts by weight of magnesium stearate is heated for 120 minutes in a carbon dioxide atmosphere at a temperature of 220° C. while stirring.

A viscous, stringy reaction product is obtained, having an hydroxyl number of 151 and an acid number of 17 and an average molecular weight of 2100. It is insoluble in water but soluble in styrene. When subjected to the "styrene emulsion test" as hereinbefore described, it separates no water and no styrene.

This reaction product is used as emulsifier for making a water-extended epoxy resin, using the following formulation:

100 parts by weight of a diglycidylether of diphenylol propane 2 parts by weight of emulsifier
100 parts by weight of water
60 parts by weight of curing agent, consisting of a mixture of an adduct of an amine and a diglycidyl ether and of dibutyl phthalate.

The liquid epoxy resin is mixed with the emulsifier and with the curing agent. Thereafter the water is emulsified at ambient temperature in this mixture thereby forming a W/O emulsion.

The emulsion is cured at a temperature of 40° C.

A water-extended epoxy resin of a uniform fine celled structure is formed. The density of the water-extended epoxy resin after evaporation of the water, which takes about 70 hours at 80° C., is 0.65.

When this procedure is repeated using the commercial emulsifiers Span 40, Span 65, Span 80, Span 85 or Tween 20 no homogeneous products can be obtained on curing.

EXAMPLE 9

The emulsifier described in Example 1 is used in the following formulation for making a water-extended epoxy resin:

100 parts by weight of a diglycidyl ether of diphenylol propane
2 parts by weight of emulsifier
50 parts by weight of water
6 parts by weight of curing agent, consisting of a mixture of an adduct of an amine and a diglycidyl ether and of dibutyl phthalate.

The epoxy resin, emulsifier and curing agent are homogeneously mixed at a temperature of 80° C. Water of a temperature of 80° C. is emulsified in this mixture, whereby an emulsion of the water-in-oil type is formed. This emulsion is cured for 2 hours at a temperature of 80° C. A homogeneous water-extended epoxy resin of fine celled structure is obtained.

I claim:

1. In a process of making water extended resins by curing in the presence of a catalyst an emulsion of water in a thermosetting resin selected from the group consisting of (a) an unsaturated polyester prepolymer containing a copolymerizable vinyl monomer being substantially insoluble in water and (b) a liquid epoxy resin, in which the emulsion is stabilized by an emulsifying agent, the improvement wherein the emulsifying agent is an esterification product which contains in its molecules residues of at least one low molecular weight polyhydric alcohol, residues of at least one aliphatic saturated or unsaturated monocarboxylic acid containing a hydrocarbon radical of at least 7 carbon atoms and residues of a polybasic carboxylic acid, said esterification product having an average molecular weight within the range of from 1,000 to 10,000, a hydroxyl number within the range of from 80 to 240 and an acid number within the range of from 0 to 50; the emulsifying agent being such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., said emulsifying agent being used in an amount of 0.1 to 5%, based on the weight of the thermosetting resin.

2. The improvement according to claim 1 wherein said emulsifying agent is an esterification product of the heating together of a mixture of:
   (a) a polyhydric alcohol,
   (b) an aliphatic saturated or unsaturated monocarboxylic acid containing a hydrocarbon radical of at least 7 carbon atoms, and
   (c) a substance selected from the group consisting of polybasic carboxylic acids and their anhydrides.

3. The improvement according to claim 2 wherein said emulsifying agent is an esterification product of the heating together of a mixture of:
   (a) 1 mol of a polyhydric alcohol selected from the group consisting of glycerol, diglycerol, polyglycerol and sorbitol,
   (b) 0.7 to 2 moles of an aliphatic monocarboxylic acid selected from the group consisting of oleic acid, lauric acid, stearic acid and caprylic acid, and
   (c) 0.7 to 1.1 moles of a polybasic carboxylic acid of the group consisting of adipic acid, azelaic acid, sebacic acid and fumaric acid.

4. The improvement according to claim 1 wherein said emulsifying agent is an esterification product of the heating together of
   (a) a glycerol ester from an aliphatic saturated or unsaturated monocarboxylic acid containing a hydrocarbon radical of at least 7 carbon atoms and
   (b) a substance selected from the group consisting of polybasic carboxylic acids and their anhydrides.

5. The improvement according to claim 4 wherein the polybasic carboxylic acid substance is present in a ratio of 0.7 to 1.1 moles per mole of the glycerol ester.

6. A water extended resin obtained by the process of claim 1.

7. In a process of making water extended resins by curing in the presence of a catalyst an emulsion of water in a thermosetting resin selected from the group consisting of (a) an unsaturated polyester prepolymer containing a copolymerizable vinyl monomer being substantially insoluble in water and (b) a liquid epoxy resin, in which the emulsion is stabilized by an emulsifying agent, the improvement wherein the emulsifying agent is an esterification product which contains in its molecules residues of at least one low molecular weight polyhydric alcohol and residues of at least one aliphatic saturated or unsaturated monocarboxylic acid containing a hydrocarbon radical of at least 7 carbon atoms, said esterification product having an average molecular weight within the range of from 1,000 to 10,000, a hydroxyl number within the range of from 80 to 240 and an acid number within the range from 0 to 50, the emulsifying agent being such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., said emulsifying agent being used in an amount of 0.1 to 5% based on the weight of the thermosetting resin.

8. The improvement according to claim 7 wherein said emulsifying agent is an esterification product of the heating together of
   (a) polyglycerol and
   (b) an aliphatic saturated or unsaturated monocarboxylic acid containing a hydrocarbon radical of at least 7 carbon atoms.

9. The improvement according to claim 8 wherein the aliphatic saturated or unsaturated monocarboxylic acid is present in an amount of at least 2 moles per mole of the polyglycerol.

10. A water extended resin obtained by the process of claim 7.

11. In a process of making water extended resins by curing in the presence of a catalyst, an emulsion of water in a thermosetting resin consisting of an unsaturated polyester prepolymer containing a copolymerizable vinyl monomer being substantially insoluble in water, in which the emulsion is stabilized by an emulsifying agent, the improvement wherein the emulsifying agent is an esterification product which contains in its molecules residues of at least one low molecular weight polyhydric alcohol, residues of at least one aliphatic saturated or unsaturated monocarboxylic acid containing a hydrocarbon radical of at least 7 carbon atoms and, residues of a polybasic carboxylic acid, said esterification product having an average molecular weight within the range of 1,000 to 10,000, a hydroxyl number within the range of from 80 to 240 and an acid number within the range from 0 to 50, the emulsifying agent being such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., said emulsifying agent being used in an amount of 0.1 to 5%, based on the weight of the thermosetting resin.

12. In a process of making water extended resins by curing in the presence of a catalyst, an emulsion of water in a thermosetting resin consisting of an unsaturated polyester prepolymer containing a copolymerizable vinyl monomer being substantially insoluble in water, in which the emulsion is stabilized by an emulsifying agent, the improvement wherein the emulsifying agent is an esterification product which contains in its molecules residues of at least one low molecular weight polyhydric alcohol and residues of at least one aliphatic saturated or unsaturated monocarboxylic acid containing a hydrocarbon radical of at least 7 carbon atoms, said esterification product having an average molecular weight within the range of from 1,000 to 10,000, a hydroxyl number within the range of from 80 to 240 and an acid number within the range from 0 to 50, wherein the emulsifying agent is such that it is capable of forming emulsions of the water-in-oil type, which is substantially insoluble in water, but soluble or dispersible in styrene and in the thermosetting resin and which possesses emulsifying properties, such that an emulion of water in styrene containing 0.5 part of said emulsifier, 100 parts of styrene and 150 parts of water does not separate any water and not more than 5 ml. of styrene from 100 ml. of the emulsion after 60 minutes at 20° C., said emulsifying agent being used in an amount of 0.1 to 5%, based on the weight of the thermosetting resin.

13. A process of making water extended resins by curing at a temperature ranging from ambient temperature up to 100° C. and in the presence of a catalyst, an emulsion of water in a thermosetting liquid epoxy resin wherein the emulsion is stabilized by an emulsifying agent which is an esterification product which contains in its molecules residues of at least one low molecular weight polyhydric alcohol, residues of at least one aliphatic saturated or unsaturated monocarboxylic acid containing a hydrocarbon radical of at least 7 carbon atoms, and residues of a polybasic carboxylic acid, and esterification product having an average molecular weight within the range of from 1,000 to 10,000, a hydroxyl number within the range of from 80 to 240 and an acid number within the range from 0 to 50; the emulsifying agent being such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., said emulsifying agent being used in an amount of 0.1 to 5%, based on the weight of the thermosetting resin.

14. A process of making water extended resins by curing at a temperature ranging from ambient temperature up to 100° C. and in the presence of a catalyst, an emulsion of water in a thermosetting liquid epoxy resin, wherein the emulsion is stabilized by an emulsifying agent which is an esterification product which contains in its molecules residues of at least one low molecular weight polyhydric alcohol and residues of at least one aliphatic saturated or unsaturated monocarboxylic acid containing a hydrocarbon radical of at least 7 carbon atoms, said esterification product having an average molecular weight within the range of from 1,000 to 10,000, a hydroxyl number within the range of from 80 to 240 and an acid number within the range of from 0 to 50, wherein the emulsifying agent is such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C., said emulsifying agent being used in an amount of 0.1 to 5%, based on the weight of the thermosetting resin.

15. A composition which can be emulsified with water to form a water-in-oil emulsion which can be cured in the presence of a catalyst while forming a water extended resin, consisting essentially of a mixture of:
   (a) 10–90% of an unsaturated polyester prepolymer and 90–10% of a copolymerizable vinyl monomer being substantially insoluble in water and
   (b) 0.1 to 5% based on the weight of (a) of an emulsifying agent consisting of an esterification product which contains in its molecules residues of at least one low molecular weight polyhydric alcohol, residues of at least one aliphatic saturated or unsaturated monocarboxylic acid containing a hydrocarbon radical of at least 7 carbon atoms and residues of a polybasic carboxylic acid, said esterification product having an average molecular weight within the range of from 1,000 to 10,000 a hydroxyl number within the range of from 80 to 240 and an acid number within the range from 0 to 50, wherein the emulsifying agent is such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C.

16. A composition which can be emulsified with water to form a water-in-oil emulsion which can be cured in the presence of a catalyst while forming a water extended resin, consisting essentially of a mixture of:
(a) 10–90% of an unsaturated polyester prepolymer and 90–10% of a copolymerizable vinyl monomer being substantially insoluble in water and
(b) 0.1 to 5% based on the weight of (a) of an emulsifying agent consisting of an esterification product which contains in its molecules residues of at least one low molecular weight polyhydric alcohol and residues of at least one aliphatic saturated or unsaturated monocarboxylic acid containing a hydrocarbon radical of at least 7 carbon atoms, said esterification product having an average molecular weight within the range of from 1,000 to 10,000, a hydroxyl number within the range of from 80 to 240 and an acid number within the range from 0 to 50, the emulsifying agent being such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C.

17. A composition which can be emulsified with water to form a water-in-oil emulsion which can be cured in the presence of a catalyst while forming a water extended resin consisting essentially of a mixture of:
(a) a liquid epoxy resin and
(b) 0.1 to 5% based on the weight of (a) of an emulsifying agent consisting of esterification product which contains in its molecules residues of at least one low molecular weight polyhydric alcohol, residues of at least one aliphatic saturated or unsaturated monocarboxylic acid containing a hydrocarbon radical of at least 7 carbon atoms and residues of a polybasic carboxylic acid, said esterification product having an average molecular weight within the range of from 1,000 to 10,000, a hydroxyl number within the range of from 80 to 240 and an acid number within the range from 0 to 50, wherein the emulsifying agent is such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C.

18. A composition which can be emulsified with water to form a water-in-oil emulsion which can be cured in the presence of a catalyst while forming a water extended resin consisting essentially of a mixture of:
(a) a liquid epoxy resin, and
(b) 0.1 to 5% based on the weight of (a) of an emulsifying agent consisting of an esterification product which contains in its molecules residues of at least one low molecular weight polyhydric alcohol and residues of at least one aliphatic saturated or unsaturated monocarboxylic acid containing a hydrocarbon radical of at least 7 carbon atoms, said esterification product having an average molecular weight within the range of from 1,000 to 10,000, a hydroxyl number within the range of from 80 to 240 and an acid number within the range from 0 to 50, the emulsifying agent being such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C.

19. A stable water-in-oil emulsion which can be cured in the presence of a catalyst thereby forming a uniform water extended resin consisting essentially of:
(a) a thermosetting resin selected from the group consisting of an unsaturated polyester prepolymer containing a copolymerizable vinyl monomer being substantially insoluble in water and a liquid epoxy resin, admixed with 0.1 to 5% based on the weight of the thermosetting resin of an emulsifying agent consisting of an esterification product which contains in its molecules residues of at least one low molecular weight polyhydric alcohol, residues of at least one aliphatic saturated or unsaturated monocarboxylic acid containing a hydrocarbon radical of at least 7 carbon atoms and residues of a polybasic carboxylic acid, said esterification product having an average molecular weight within the range of from 1,000 to 10,000, a hydroxyl number within the range from 80 to 240 and an acid number within the range from 0 to 50, wherein the emulsifying agent is such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C. as the continuous oil phase and
(b) water as the dispersed phase 20. A stable water-in-oil emulsion which can be cured in the presence of a catalyst, thereby forming a uniform water extended resin consisting essentially of:
(a) a thermosetting resin selected from the group consisting of an unsaturated polyester prepolymer containing a copolymerizable vinyl monomer being substantially insoluble in water and a liquid epoxy resin, admixed with 0.1 to 5% based on the weight of the thermosetting resin of an emulsifying agent consisting of an esterification product which contains in its molecules residues of at least one low molecular weight polyhydric alcohol and residues of at least one aliphatic saturated or unsaturated monocarboxylic acid containing a hydrocarbon radical of at least 7 carbon atoms, said esterification product having an average molecular weight within the range of from 1,000 to 10,000, a hydroxyl number within the range of from 80 to 240 and an acid number within the range from 0 to 50, wherein the emulsifying agent is such that it is capable of forming emulsions of the water-in-oil type, which is substantially insoluble in water, but soluble or dispersible in styrene and in the thermosetting resin and which possesses emulsifying properties, such that an emulsion of water in styrene containing 0.5 part of said emulsifier, 100 parts of styrene and 150 parts of water does not separate any water and not more than 5 ml. of styrene from 100 ml. of the emulsion after 60 minutes at 20° C. as the continuous oil phase and
(b) water as the dispersed phase.

References Cited
UNITED STATES PATENTS

| | | | |
|---|---|---|---|
| 3,041,318 | 6/1962 | Hess | 260—29.6 |
| 3,256,219 | 6/1966 | Will | 260—29.2 |
| 3,442,842 | 5/1969 | Bonin | 260—29.2 |
| 3,574,157 | 4/1971 | Markus | 260—835 |
| 3,591,191 | 7/1971 | Coderre et al. | 260—861 |

FOREIGN PATENTS

| | | | |
|---|---|---|---|
| 187,298 | 10/1922 | Great Britain | 260—29.6 |
| 647,133 | 12/1950 | Great Britain | 260—29.6 |
| 964,195 | 7/1964 | Great Britain | 260—29.6 |
| 887,442 | 1/1962 | Great Britain | 260—29.6 |
| 1,208,905 | 10/1970 | Great Britain | 260—29.6 |
| 6,714,220 | 4/1968 | Netherlands | 260—29.6 |

DONALD E. CZAJA, Primary Examiner

R. W. GRIFFIN, Assistant Examiner

U.S. Cl. X.R.

117—161 K, 161 ZB; 260—2.5 EP, 2.5 N, 22 EP, 29.2 UA, 29.2 EP, 29.6 WQ